United States Patent [19]

Jenkins

[11] 4,247,063
[45] Jan. 27, 1981

[54] FLIGHT CONTROL MECHANISM FOR AIRPLANES

[75] Inventor: Michael W. Jenkins, Marietta, Ga.
[73] Assignee: Lockheed Corporation, Burbank, Calif.
[21] Appl. No.: 931,735
[22] Filed: Aug. 7, 1978
[51] Int. Cl.² .............................................. B64C 5/08
[52] U.S. Cl. ...................... 244/91; 244/327; 244/199
[58] Field of Search ............... 244/91, 90 R, 90 A, 244/198, 199, 130, 213, 201, 49, 3.27, 3.28, 3.29

[56] References Cited

U.S. PATENT DOCUMENTS

| | | | |
|---|---|---|---|
| 2,365,577 | 12/1944 | Moore | 244/3.28 |
| 2,846,165 | 8/1958 | Axelson | 244/90 R |
| 3,022,965 | 2/1962 | Caciagli | 244/90 R |
| 4,017,041 | 4/1977 | Nelson | 244/91 X |

*Primary Examiner*—Barry L. Kelmachter
*Attorney, Agent, or Firm*—John J. Sullivan

[57] ABSTRACT

Retractable wing-tip mounted vanes are actuated from the normal cockpit controls of an airplane to provide both roll control and direct lift control. When not required, these devices retract into wing fairings. Simple to manufacture and operate, these controls permit reduced manufacturing costs through much simpler wing construction. The vanes consist of suitably constructed plates that slide over one another and which form an end plate to the wing when fully deployed. Asymmetric deployment produces an out-of-balance moment in roll; symmetric deployment induces direct lift by increasing wing lift on both wing panels.

4 Claims, 5 Drawing Figures

U.S. Patent  Jan. 27, 1981  Sheet 1 of 2  4,247,063
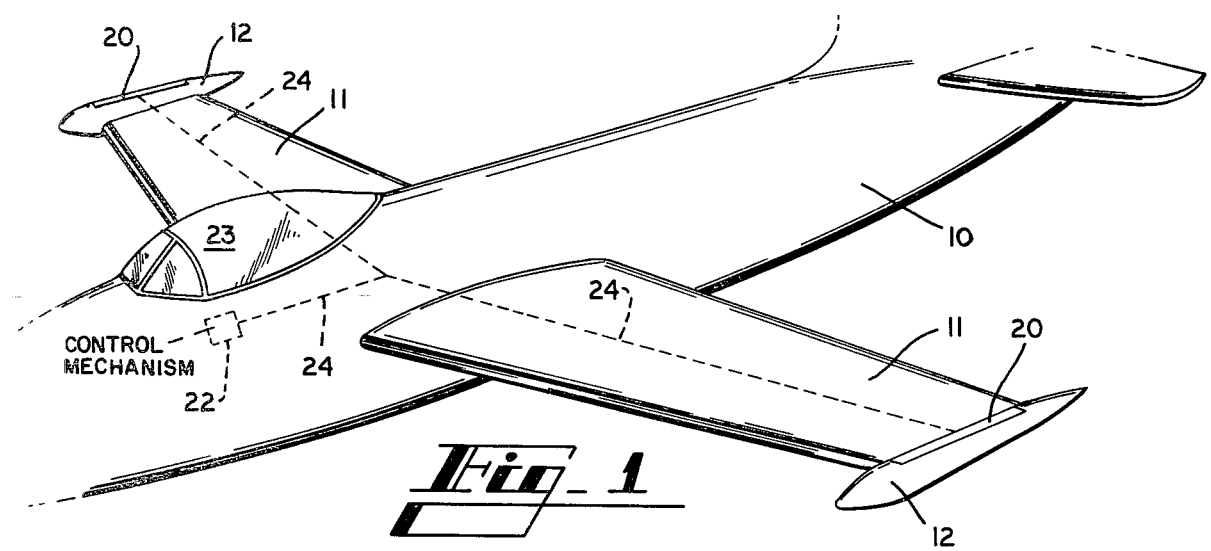
Fig_1
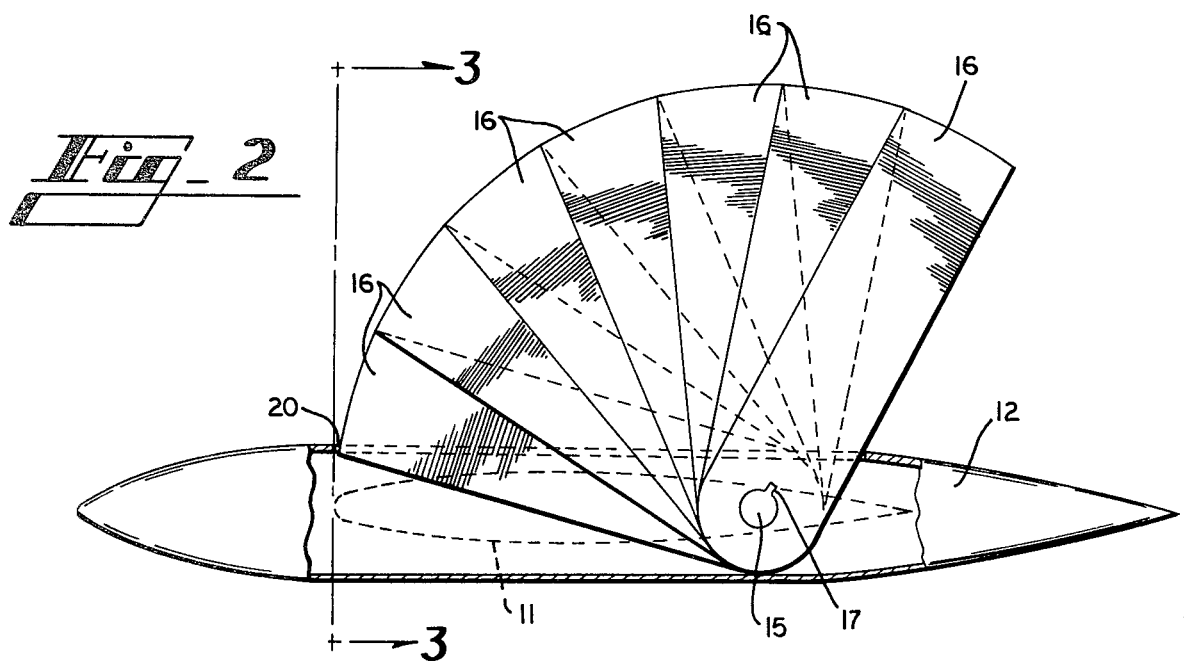
Fig_2
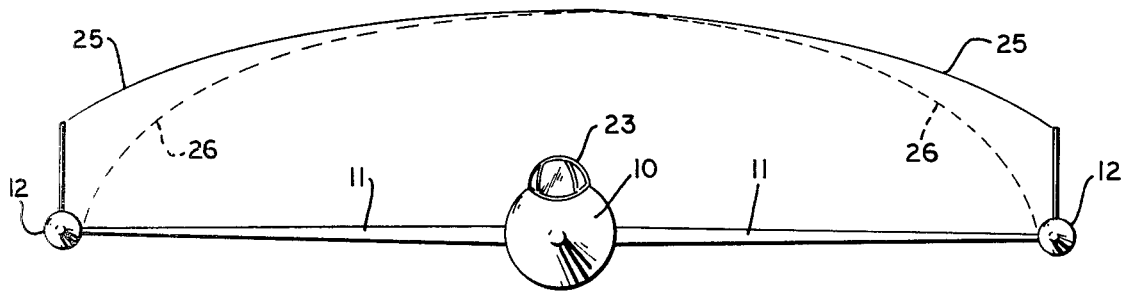
Fig_5

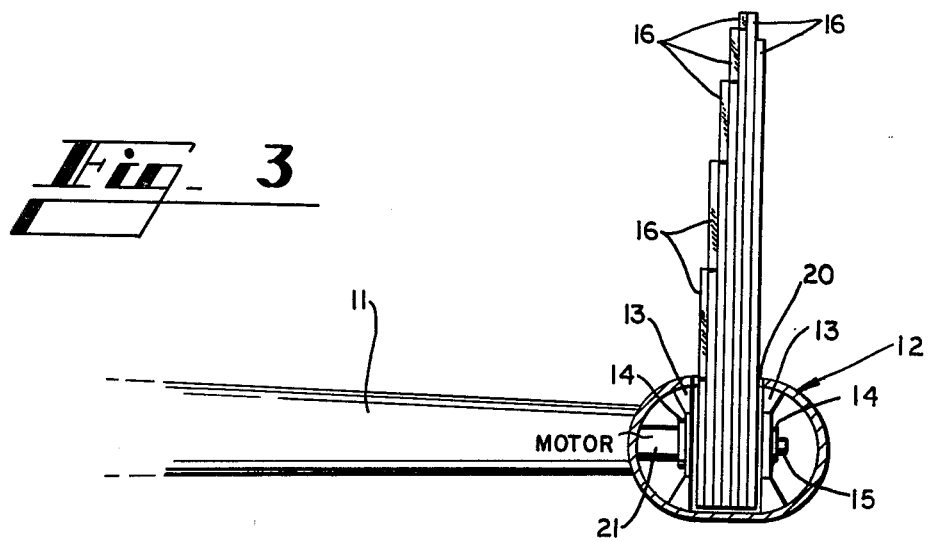
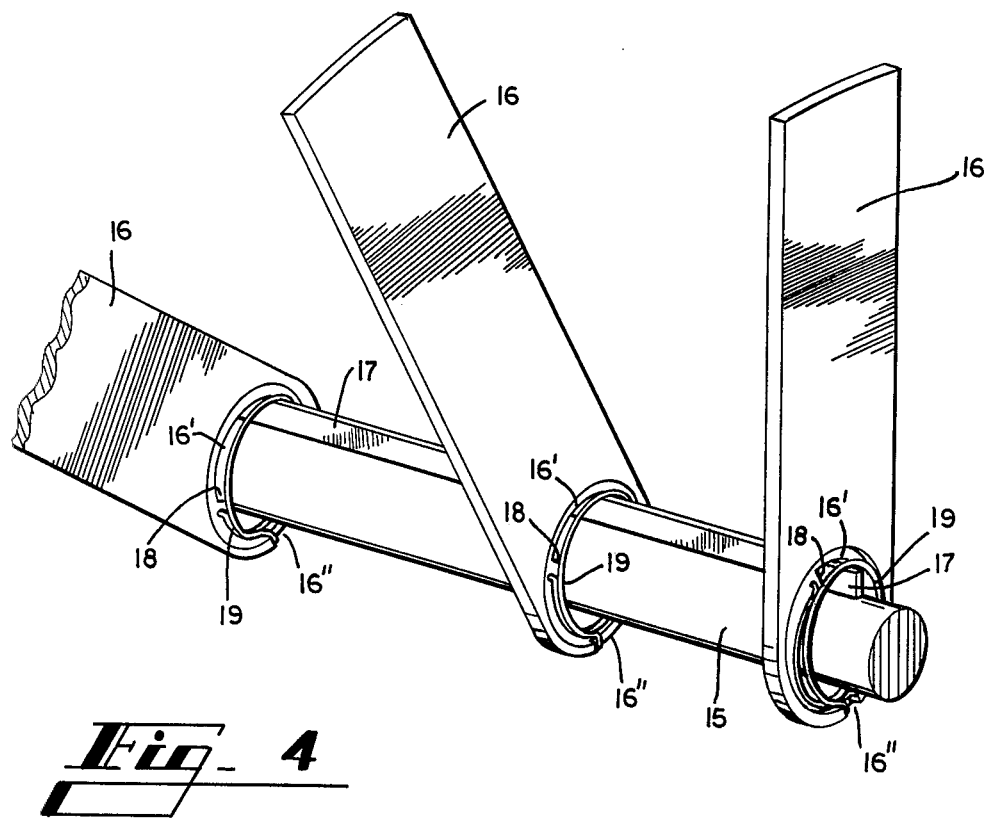

FLIGHT CONTROL MECHANISM FOR AIRPLANES

This invention relates to flight control devices for airplanes and more particularly to a flight control device mounted for extension and retraction relative to the lift surfaces of the airplane whereby the load distribution on such surface may be readily varied over a wider range than heretofore and the movement of the airplane thereby controlled in optimum fashion.

Generally, fixed wing airplanes are presently flight controlled by movable external surfaces, such as ailerons, rudders and elevators. To a limited degree such movable external surfaces have been combined in an effort to adjust to different airplane designs and to improve the operating efficiency thereof. For example, in delta wing airplanes the aileron and elevator have been integrated. Similarly in so-called "V-tail" airplanes the elevator and rudder have been combined.

Additionally, ailerons have been integrated with flaps, which, although not flight control devices in the true sense, are movable external surfaces operable during take-off and landing. In these components, sometimes referred to as "full span flaps", the outer end portion of the flap is adapted for differential movement to perform as an aileron during normal flight or cruise.

In any case, the above prior art surface control devices require operating linkage, actuators and the like for their performance. Also, allowances for structural support within the airframe must be made to accommodate such devices. As a result, complex mechanisms, prone to malfunction and of increased weight, inevitably evolve as more sophisticated airplanes are designed.

It was for the purpose of reducing the complex and weighty operating mechanisms that the fly-by-wire concept was initially conceived. Under the fly-by-wire principle electrical signals, as opposed to mechanical linkage, are employed to control operation of the moving force or servomechanism which actuates the control surface. For reasons not important here, fly-by-wire has not been extensively adopted; however, its many advantages are well recognized.

Separately, in an effort to improve airplane performance and improve the efficiency of fixed wing airplanes, the "end plate" has been employed. While this device has not always taken the form of a plate, it effectively acts as one, being mounted at the tip of the wing and disposed in a vertical position. Ideally these devices extend on the order of two-thirds above and one-third below the wing having the effect of increased wing span with an increase in the aspect ratio and a reduction of induced drag.

The present invention builds on the above state-of-the-art and proposes a control system for airplanes which integrates the advantages of the end plate with the movable external surface and the fly-by-wire technologies to produce results heretofore unobtainable. Thus, simplified and lower cost wing or tail can be built; actuating loads are minimal compared with existing structures; for roll control comparatively small wing loads are necessary for the same roll performance; operation and maintenance is substantially facilitated by the relatively uncomplicated arrangement herein proposed.

More specifically, the flight control mechanism of this invention comprises an extendible and retractable vane mounted adjacent each wing tip with a remotely controlled actuator for the movement thereof in a plane substantially normal to the associated wing. When actuated in unison the extended vanes at opposite wing tips cause a predetermined loading on the wings to effect a lift. When on the other hand only one of the vanes is extended wing loading is such as to produce airplane roll. For extended cruise periods, the vanes can be partially symmetrically deployed to change the load distribution on the wings causing an increase in the effective aspect ratio hereof which reduces drag and fuel consumption to increase range.

With the above and other objects in view as will be apparent, this invention consists in the construction, combination and arrangement of parts all as hereinafter more fully described, claimed and illustrated in the accompanying drawings, wherein:

FIG. 1 is a perspective view of the major portion of a typical airplane as modified to include wing tip vanes as contemplated herein to show the general arrangement thereof, the vanes being disposed in their fully retracted position within pods or fairings constituting an integral part, in effect, of each wing structure;

FIG. 2 is a side view of one of the airplane wings of FIG. 1 showing the associated fairing and the vane disposed in the fully extended position, part of the fairing being broken away to reveal the interior portion thereof where the vane is housed when fully retracted;

FIG. 3 is a section taken along line 3—3 of FIG. 2 to show a frontal view of the vane, its segmented composition, its mounting and its actuating mechanism by which it is moved to and from its extreme positions of extension and retraction;

FIG. 4 is a perspective view of a portion of a drive shaft and some of the vane segments or plates thereon to show in exploded position the manner of mounting the vane segments or plates for sequential movement to and from the extended positions where they are disposed in staggered arrangement; and FIG. 5 is a front view of the airplane illustrated in FIG. 1 to show the principle of operation of the invention by indicating the lift distribution with the control vanes adjacent the wing tips extended compared with the lift distribution with these control vanes retracted.

Referring more particularly to the drawings, 10 designates a typical airplane having fixed wings 11. At its tip each wing 11 terminates in an aerodynamic fairing or pod 12 which is secured thereto in any conventional manner so as to be, in effect, an integral part of the associated wing 11. Each pod 12 is hollow internally and structurally supported by a pair of spaced bulkheads 13 mounting aligned bearings 14 to support a drive shaft 15.

A plurality of vane segments or plates 16 are mounted on each shaft 15 between the bulkheads 13. To this end, each plate 16 is pierced by a hole adjacent one of its ends through which the shaft 15 passes, a key 17 being provided on the shaft 15 for coaction with a slot 18 in each plate 16. The several slots 18 have fixed widths which differ one from the next so as to be progressively longer whereby rotation of the drive shaft 15 in each direction causes each successive plate to move with it at a predetermined, delayed interval. Thus, when the first plate 16 has reached its full deflection in extending, the remaining plates 16 are splayed out like a fan (FIG. 2), each being disposed at a different angle. When fully retracted, the corresponding edges of the several slots 18 of the plate 16 are coincident with the sides of all the plates 16 disposed in a common plane like a folded fan.

All of the plates 16 are retained at all times against the driving face of the key 17 by an appropriate power device, such as, for example, a spiral spring 19. One end of each spring 19 is fixed to the associated plate 16 and the other end to structure of the pod 12 so that a constant closing force on each plate is maintained. Each spring 19 is retained in a groove 16' in the associated plate 16 to eliminate undesirable spacing of the several plates 16 and the shaft 15. In addition a cutout 16" is provided in each plate 16 to permit the end of the associated spring 19 to be suitably anchored in the pod 12, the length of each such cutout 16" being determined by the angular displacement of its plate 16.

Each plate 16 is preferably identical one to the other, being sized to approximately the length of the chord of the wing 11 at its tip with a width of about twice the maximum thickness of the wing 11. When in the fully extended position (FIGS. 2 and 3), the outer edge of the plate or plates 16 closest to the perpendicular relative to the wing 11 projects about one wing-tip chord length above the wing 11, preferably seven plates 16 being employed in the device. At the same time the extended vane defines substantially the entire edge of the wing tip. Each plate thickness is maintained at a minimum commensurate with rigidity at all times and positions under the imposed loads of maximum airplane performance.

Having determined the overall dimensions of the aggregate plates 16, each pod 12 is sized accordingly to contain the plates 16 when retracted. Preferably each pod 12 is identical to the other, generally circular in its transverse dimension and tapering at opposite ends in streamlined cones. The upper surface of each pod 12 is slotted as at 20 to permit the extension and retraction of the several plates 16. When fully retracted, the edges of the several plate 16 are designed and constructed to lie flush with the upper exterior surface of the pod 12 and thereby form an aerodynamically clean continuation thereof.

In order to control the operation of each set of plates 16 at opposite wing tips, an appropriate motor 21 is provided. While any suitable motor 21 may be employed for the purpose, it is envisioned that an electrically powered, reversible motor is preferred. In any case, these motors 21 are remotely controlled by a lever, switch or the like as indicated at 22 operatively mounted in the cockpit or cabin 23 of the airplane 10. Conventional connections 24 are provided between the control 22 and each motor 21 for the operation thereof in either direction in unison or singly for extension and retraction of each set of plates 16.

FIG. 5 shows a wing load distribution under different conditions of operation of the control devices. With each plate 16 of both vanes fully extended, the load distribution on the wing 11 is indicated at a higher level 25. With each vane 16 fully retracted, the load distribution on the wing 11 is at the lower level 26. The difference in loading will cause a lift with symmetric positioning (each vane set extended) and a roll with asymmetric positioning (one vane set extended).

With each plate 16 of both vanes partially extended (not shown) the load distribution on the wing 11 is at a corresponding intermediate level, i.e., a predetermined level between levels 25 and 26. The precise extension of the vanes and the intermediate load distribution level thereby resulting will depend on such variables as wing area aspect ratio and speed of the airplane in the cruise flight regime where optimizing the load distribution results in a minimum drag with an accompanying reduction in fuel consumption and greater range.

While the invention has been hereinabove illustrated and described in what is believed to be its best and most practical form under present day condition, it is recognized that under other conditions, this form would be modified. No attempt has been made to specifically incorporate any of such other forms in this disclosure in the interest of clarity of the total inventive concept. The claims are relied upon to cover these other forms generally.

What is claimed is:

1. A flight control mechanism for an airplane having a fuselage and fixed wings extending laterally from said fuselage comprising an aerodynamic pod carried by each said wing adjacent the outer tip thereof, a slot in the upper surface of each said pod, a vane defined by flat sides disposed at all times in a fixed vertical plane substantially parallel to the longitudinal centerline of said fuselage and mounted internally of each said pod for vertical movement only in said fixed vertical plane to and from extreme positions of extension and retraction through its associated slot relative to its said pod and the upper surface only of the associated wing whereby the lower surface of each said pod and said associated wing remains aerodynamically unchanged, and a control device operative to move each said vane selectively in unison and individually.

2. The mechanism of claim 1 wherein the dimensions of each said vane are such that when fully extended each vane projects about one wing-tip chord length above the associated wing and is substantially coextensive with the wing tip edge.

3. The mechanism of claim 1 wherein each said vane includes a plurality of adjacent plates all mounted on the same pivot and individually engageable with said pivot at different radial angles and a power drive operative on said pivot for the rotation thereof whereby each of said adjacent plates is moved a predetermined different distance so as to splay out and fold up like a fan upon operation of said control device as aforesaid.

4. The mechanism of claim 3 wherein said plate is identical, approximately equal in length to the chord of said associated wing at its tip about twice as wide as the maximum thickness of said associated wing.

* * * * *